(No Model.)
P. J. RABB.
DRAFT EQUALIZER.
No. 486,265. Patented Nov. 15, 1892.
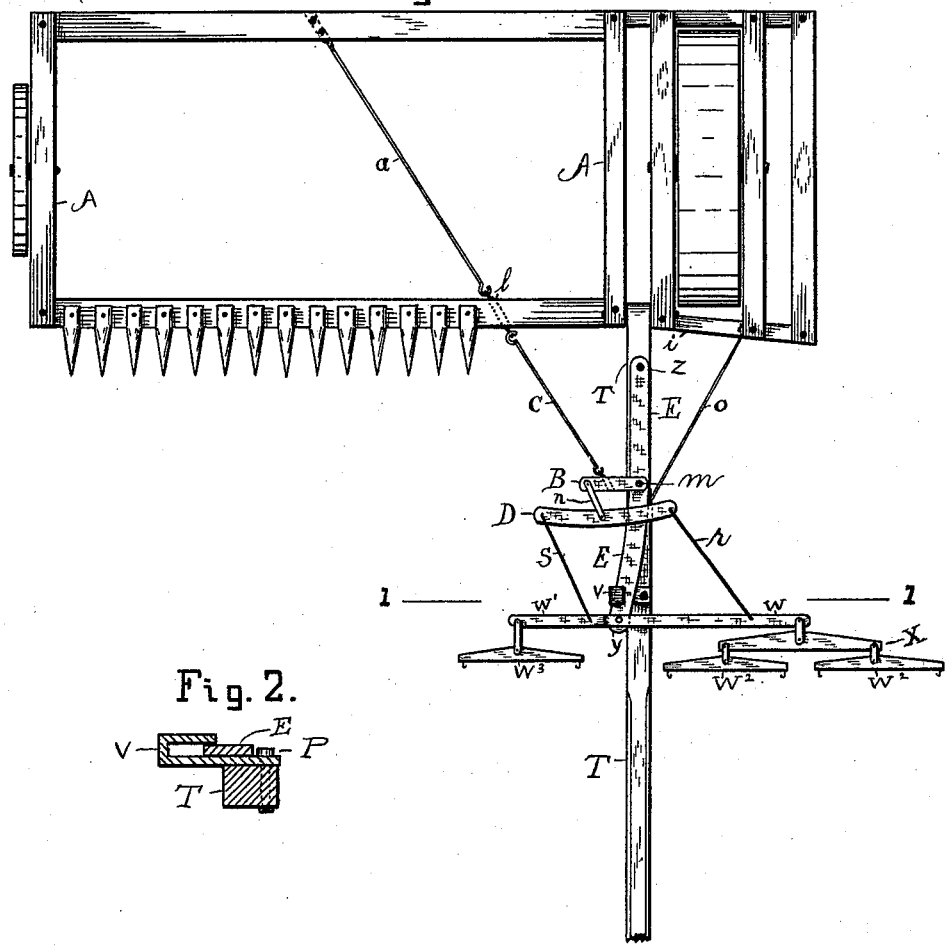
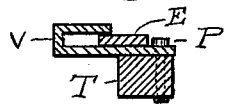
Witnesses:
Ray Hutchins.
Herbert Powell.
Inventor:
Philipp J. Rabb. By
Thos. H. Hutchins his atty.
THE NORRIS PETERS CO., PHOTO-LITHO., WASHINGTON, D. C.

UNITED STATES PATENT OFFICE.

PHILIPP J. RABB, OF FRANKFORT, ILLINOIS.

DRAFT-EQUALIZER.

SPECIFICATION forming part of Letters Patent No. 486,265, dated November 15, 1892.

Application filed August 8, 1892. Serial No. 442,525. (No model.)

*To all whom it may concern:*

Be it known that I, PHILIPP J. RABB, a citizen of the United States of America, residing at Frankfort Station, in the county of Will and State of Illinois, have invented certain new and useful Improvements in Draft-Equalizers, of which the following is a specification, reference being had therein to the accompanying drawings, and the letters of reference thereon, forming a part of this specification, in which—

Figure 1 is a plan view of the draft-equalizer, showing it applied to the frame of a reaping-machine; and Fig. 2 is a cross-sectional view on line 1 of Fig. 1.

This invention relates to certain improvements in draft-equalizers, which improvements are fully set forth and explained in the following specification and claim.

Referring to the drawings, A represents a frame of a reaper or mowing-machine, showing the draft-equalizer attached and intended to lessen the side draft of the machine.

T is a tongue pivotally attached at $i$ to the machine-frame and braced by means of a brace-rod $e$.

E is an arm having its rear end pivotally attached to the top of the tongue T near its inner end at $z$ and having its outer end curved slightly to the grain side of the reaper and pivotally connected to the inner ends of the two arms $w$ and $w'$ at $y$.

B is a short arm pivotally connected at its inner end to the arm E at about its center and extending at about right angles therewith toward the cutter-bar side of the machine and having pivotally connected to its outer end by means of the clevis $n$ the doubletree D. The outer ends of said doubletree are respectively connected to the arms $w$ $w'$ between their ends by means of the rods $r$ and $s$.

$x$ is a doubletree connected to the outer end of arm $w$ and is provided with a pair of whiffletrees $w^2$ $w^2$ for a pair of horses at that side of the tongue.

$w^3$ is a whiffletree connected to the outer end of arm $w'$ for a single horse at that side of the tongue. The arm B is connected by means of the rods $a$ $b$ $c$ with the rear under side of the machine-frame at about its center, so that the draft is substantially from the rear part of the frame instead of the tongue, so as to overcome the side draft to a very great degree, if not entirely. The outer end of the arm E has lateral movement to the extent permitted by the hooked plate $v$, secured on the top of the tongue, and by the head of bolt P, which secures said plate to the tongue, as shown particularly in Fig. 2. This lateral movement of arm E is necessary to some extent and within the limits of said hooked plate, so as to relieve the horses from the whip of the tongue and to cause the direction forward of the machine to be unaffected by the swaying of the horses from one side to the other. By this arrangement of parts three horses are used—one on the inner side of the tongue next the grain and the other two on the outer side of the tongue—and the rods $r$ $s$ are so disposed with relation to arms $w$ $w'$ that all three horses will have the same draft, and such arrangement of parts and disposition of horses will reduce the side draft of the machine to such extent that the team will be entirely unaffected thereby.

Having thus described my invention, what I claim as new, and desire to secure by Letters Patent, is as follows, to wit:

In a draft-equalizer, the combination of the tongue T, arms E B $w$ $w'$, doubletrees D and $x$, whiffletrees $w^2$ $w^2$ $w^3$, rods $a$ $b$ $c$ $r$ $s$, and hooked plate $v$, all arranged to operate substantially as and for the purpose set forth.

PHILIPP J. RABB.

Witnesses:
   THOS. H. HUTCHINS,
   RAY HUTCHINS.